United States Patent Office 3,487,117
Patented Dec. 30, 1969

3,487,117
SYNTHESIS OF 2,6-DISUBSTITUTED
HYDROQUINONES
Elmar R. Altwicker, 13 Grouse Road,
Somerville, N.J. 08876
No Drawing. Filed Sept. 27, 1966, Ser. No. 582,251
Int. Cl. C07c 37/00
U.S. Cl. 260—625                          9 Claims

ABSTRACT OF THE DISCLOSURE 2,6-disubstituted hydroquinone is produced by effecting a dienone-phenol re-arrangement of a 2,6-disubstituted-4-tertiary alkyl substituted quinol under acidic conditions with the re-arrangement resulting in the elimination of tertiary alkyl groups in the —4— position of the quinol.

---

This invention relates to the production of 2,6-disubstituted hydroquinones and is directed particularly to methods whereby relatively high yields of said products can be obtained from relatively inexpensive quinols.

The process of the present invention involves the elimination of the —4-tertiary alkyl group from a 2,6-disubstituted-4-tertiary alkyl quinol under acidic rearrangement conditions.

2,6-disubstituted hydroquinones are valuable antioxidants and are useful as stabilizers for organic compounds and as intermediates for use in the production of various antioxidants, esters and monocarbamates. However, as heretofore produced, they generally have been derived from relatively expensive hydroquinones by alkylation thereof under acid conditions. Such reactions are found to yield primarily the 2,5-isomers of the hydroquinones with relatively limited yields of the 2,6-disubstituted compounds. 2,6-disubstituted hydroquinones may also be produced by the oxidation of compounds such as 2,6-ditertiary butyl —4-methyl phenol to 2,6-ditertiary butyl benzoquinone which is thereafter reduced to obtain the desired end product. However, this process is obviously complicated and expensive to carry out.

I have discovered that it is possible to obtain high yields of 2,6-disubstituted hydroquinones from the corresponding 2,6-disubstituted quinols which have a tertiary alkyl substituent in the 4-position, by a catalytically induced reaction involving a dienone-phenol rearrangement which actually proceeds with elimination of the tertiary substituent from the 4-position of the quinol. This process is very simple and economical to carry out and for this purpose, it is found that it is possible to employ any of a wide range of catalysts.

The reaction is facilitated when carried out in the presence of a solvent and may be conducted at temperatures within the range of from about —20° C. to 150° C. but preferably at temperatures of from about 10° C. to 80° C. The time required for substantial completion of the reaction may vary from about 1 minute to several days. The time and temperature required for any specific reaction depends primarily on the nature of the catalyst and the quinol employed. In some instances and when using certain catalysts, it may be found advantageous to conduct the reaction under reduced pressures or in the presence of an inert atmosphere.

Accordingly, the principal objects of the invention are to reduce the cost of producing 2,6-disubstituted hydroquinones, and to increase the yield and purity of the product obtained in the manufacture thereof.

A specific object of the invention is to provide novel methods for producing 2,6-disubstituted hydroquinones from 2,6-disubstituted quinols which have a tertiary alkyl substituent in the 4-position of the quinol.

Another specific object of the invention is to provide novel dienone-phenol rearrangement reactions which involve the elimination of a tertiary alkyl substituent from the 4-position of a 2,6-disubstituted quinol.

In accordance with the present invention, the quinol employed may have the general formula

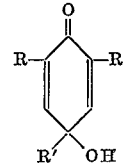

wherein R is a normal propyl or isopropyl, normal butyl, isobutyl, secondary butyl or tertiary butyl, or is a higher saturated alkyl group. In the alternative, R may be a cycloalkyl group such as a cyclopentyl or cyclohexyl group, or an aryl group such as a phenyl or naphthyl group, or a halogen substituted phenyl or naphthyl group. R' may be any saturated tertiary alkyl group such as tertiary butyl, tertiary amyl, tertiary octyl cumyl or the like. In most instances, R' is preferably a tertiary butyl group.

The reaction is generally carried out in the presence of an aqueous or non-aqueous solvent or mixtures thereof and for this purpose, alcohols, either paraffin or aromatic hydrocarbons, acid anhydrides, chlorinated solvents such as tetrachlorethane, chlorobenzene, and mixtures of solvents such as a mixture of benzene and nitro methane may be used. Other preferred solvents may be employed as desired.

The catalysts employed in carrying out the reaction may be used in amounts varying from a trace up to about 5% based on the weight of the quinol used. Generally from about 0.01 to 5% of the catalyst is preferred.

Among the catalysts which may be used are:

(1) Lewis acids including specifically—$BF_3$, $ZnCl_2$, $AlCl_3$, $AlBr_3$, $BF_3 \cdot Et_2O$, $AlCl_3 \cdot CH_3NO_2$, $AlCl_3 \cdot PhNO_2$, $GaCl_3$, $GaBr_3$, $ZrCl_4$, $ZrBr_4$, $BiCl_3$, $BiBr_3$, $MoCl_5$, $SbCl_3$, $SbBr_3$, $TiCl_3$, $NbCl_5$, $TaCl_5$, $SnCl_4$.

(2) Proton acids including specifically:
   (a) Inorganic acids—HCl (aqueous or gaseous) HF, HBr, sulfuric phosphoric, pyrophosphoric, polyphosphoric, perchloric, chlorosulfonic, fluorosulfonic.
   (b) Organic acids having dissociation constants greater than $10^{-4}$, such as citric, bromoacetic, chloroacetic, dichloroacetic, formic, maleic, oxalic, o-phthalic, salicylic, trichloroacetic, trifluoroacetic, alkanesulfonic and arylsulfonic acids.

(3) Acidic oxides such as—aluminum oxide; aluminum-silicon oxide mixtures and phosphorous pentoxide.

In order to illustrate typical procedures embodying the present invention, the following examples are cited.

EXAMPLE I 2,6-ditertiary-butyl hydroquinone was produced from 2,4,6 - tri - t - butyl - 4 - hydroxy - 2,5 - cyclo - hexadienone, by dissolving 6 grams of the quinol in 30 ml. of methanol and passing gaseous hydrogen chloride into the solution for a short time, say 30 seconds. The solution was maintained at room temperature for about 5 minutes after which it was concentrated until crystallization set in. The resulting crystalline product was then filtered, washed with water, and dried whereby there was obtained a yield of 2,6-ditertiary butyl hydroquinone equal to 96% of theory and having a melting point of 104–5° C. and a purity of 98% as determined by gas-liquid chromatography. The infrared spectrum of the product was identical with that of 2,6-ditertiary butyl hydroquinone prepared by reduction of 2,6-ditertiary benzoquinone.

EXAMPLE II

To 1.0 g. of 2,4,6-tri-t-butyl-4-hydroxy-2,5-cyclo-hexadienone in 20 ml. ethanol was added 1 ml. 6 N $H_2SO_4$. After 1 hour at room temperature, only unreacted starting material was recovered. After 1 hour on a steam bath, the cooled solution was diluted with water. The precipitate was filtered, washed, and dried. The white residue weighed 0.75 g. (94% yield), its infrared spectrum and its retention time on the gas chromatographic column were identical to 2,6-di-t-butyl hydroquinone. After one recrystallization from hexane, the product had M.P. 114.5–116.0°.

EXAMPLE III

A solution of 2,4,6-tri-t-butyl-4-hydroxy-2,5-cyclo-hexadienone in acetic anhydride containing about 2% trichloroacetic acid was warmed 1 hour on a steam bath. The cooled reaction mixture was poured into ice water and the solid filtered, washed, and dried. There was obtained an 80% yield of 2,6-di-t-butyl hydroquinone, M.P. 102–5°, its retention time on gas-liquid chromatography was identical to an authentic sample.

EXAMPLE IV

A solution of 1.5 g. of 2,4,6-tri-t-butyl-4-hydroxy-2,5-cyclo-hexadienone in trifluoroacetic anhydride containing a trace of trifluoroacetic acid was refluxed (42° C.) for 5 minutes. The reaction mixture was poured into ice water. The solid residue was washed and dried. Its infrared spectrum was similar to 2,6-di-t-butyl hydroquinone and its retention time on gas-liquid chromatography was identical thereto. Yield: 0.95 g., 79%.

The present invention in general in its application to 2,6-disubstituted-4-tertiary alkyl substituted quinols as exemplified by the following example wherein 2,6-ditertiary amyl hydroxyquinone is produced.

EXAMPLE V

To 2,4,6 - tri - t - amyl - 4 - hydroxy - 2,5 - cyclohexadienone in methanol at room temperature was added gaseous hydrochloric acid. After standing for a few minutes, the reaction was diluted with water and filtered. The crystalline residue was washed and dried, M.P. 108–111°, the infrared spectrum was identical to 2,6-di-t-amyl hydroquinone.

EXAMPLES VI TO XI

Additional examples illustrating typical embodiments of the present invention as carried out in Example I are set forth in the following table. 2,6-ditertiary butyl hydroquinone was produced in each case by rearrangement of the molecule with elimination of the tertiary butyl group from the 4-position of 2,4,6-tri-t-butyl-4-hydroxy-2,5-cyclo-hexadienone.

| Example | VI | VII | VIII | IX | X | XI |
| --- | --- | --- | --- | --- | --- | --- |
| Catalyst | Conc. HCl | HCl | $ZnCl^2$ | AgHCl | gas HCl | JCl. |
| Amount | 0.01 gm | 6.4 N, gm | 0.1 gm | 5% | Trace | 1 ml., 6 N. |
| Solvent | Aq. ethanol | Methanol | Benzene | Methanol | Methanol | Ethanol. |
| Amount, ml | 20 | 20 | 15 | 20 | 20 | 20. |
| Time, min | 120 | 15 | 500 | 10 | 5 | 60. |
| Temp., °C | Reflux | 25 | 25 | 25 | 25 | 70. |
| Yield, percent | 90.5 | 95 | 85 | 94 | 96 | 94. |
| Color | White | White | Yellow | White | White | White. |
| M.P., deg | 103–104 | 97–102 | 93–96 | 93–100 | 97–103 | 115–6. |

Analysis and identification of the products obtained in the foregoing examples was made by infrared spectroscopy, gas-liquid chromatography, and melting point and by oxidation of the product to 2,6-ditertiary butyl benzoquinone. The purity of the product in each case was 95% or higher by gas-liquid chromatography.

Each of the processes of Examples I to XI were also carried out by substituting other catalysts for those recited. Thus, p-toluene sulfonic acid, anhydrous ferric chloride, acidic alumina and aluminum chloride were employed in amounts varying from a trace of 2.5% based on the weight of the quinol. The reaction time required when using such catalysts was generally increased to from about 30 minutes to 4 days. However, it is possible to reduce the reaction time and to materially increase the yield and purity of the desired end product when using such catalysts, by carrying out the reaction at reduced pressures or in the presence of an inert atmosphere such as nitrogen. On the other hand, it is not ordinarily necessary to resort to these conditions when using inorganic-protonic acids, or zinc chloride as the catalyst for the reaction.

While the invention as herein described has been exemplified by reference to typical quinols and specific examples, it will be apparent that the quinols and catalysts used and the reaction conditions employed are capable of wide variation depending upon the end product desired. In view thereof, it should be understood that the particular agents and procedures cited above are intended to be illustrative only and are not intended to limit the scope of the invention.

I claim:

1. The method of producing a 2,6-disubstituted hydroquinone which comprises the step of contacting a 2,4,6-tri-t-alkyl-4-hydroxy-2,5-cyclo-hexadienone with an acidic H in a liquid medium at a temperature within the range of about −20° C. to 180° C. and for a period of from about 1 minute to 4 days, the amount of said catalyst employed being equal to about 0.01 to 5% by weight based upon the weight of the quinol employed whereby acidic rearrangement with the elimination of the tertiary alkyl group in the —4— position is effected.

2. The method as defined in claim 1 wherein the catalyst employed is an inorganic acid.

3. The method as defined in claim 1 wherein the catalyst employed is hydrochloric acid.

4. The method as defined in claim 1 wherein the catalyst employed is sulfuric acid.

5. The method as defined in claim 1 wherein the catalyst employed is an organic acid (dissociation constant greater than $10^{-4}$).

6. The method as defined in claim 1 wherein the catalyst employed is a Lewis acid catalyst.

7. The method as defined in claim 1 wherein the quinol employed is 2,4,6-tri-t-butyl-4-hydroxy-2,5-cyclo-hexadienone.

8. The method as defined in claim 1 wherein the tertiary alkyl group is selected from the group consisting of tertiary butyl, tertiary amyl and tertiary octyl groups.

9. The method as defined in claim 1 wherein the catalyst is selected from the group consisting of zinc chloride, aluminum oxide, trichloroacetic acid and trifluroacetic acid.

References Cited

UNITED STATES PATENTS 2,369,197    2/1945    Winkler et al. _____ 260—621

OTHER REFERENCES

Müller et al., Ber. 88, 1819–24 (1955).

BERNARD HELFIN, Primary Examiner

W. B. LONE, Assistant Examiner

U.S. Cl. X.R.

260—619, 620, 621, 623